No. 826,037. PATENTED JULY 17, 1906.
S. C. KINDIG.
NUT AND BOLT LOCK.
APPLICATION FILED JAN. 26, 1906.

Witnesses:

Inventor:
Samuel C. Kindig
By Chapman & Ferguson
Attorney.

UNITED STATES PATENT OFFICE.

SAMUEL C. KINDIG, OF BALTIMORE, MARYLAND, ASSIGNOR OF ONE-HALF TO FREDERICK HENKELMAN, OF BALTIMORE, MARYLAND.

NUT AND BOLT LOCK.

No. 826,037.  Specification of Letters Patent.  Patented July 17, 1906.

Application filed January 26, 1906. Serial No. 297,925.

*To all whom it may concern:*

Be it known that I, SAMUEL C. KINDIG, a citizen of the United States, residing at Baltimore, in the State of Maryland, have invented a new and useful Nut and Bolt Lock, of which the following is a specification.

This invention relates to improvements in nut and bolt locks, and is especially adapted for use on railway fish-plates.

The object of the invention is to provide a simple, cheap, and efficient device by means of which the nut and bolt are both locked and prevented from turning when secured in position.

Other features of the invention will be fully set forth in the following specification and pointed out in the claims.

Figure 1:
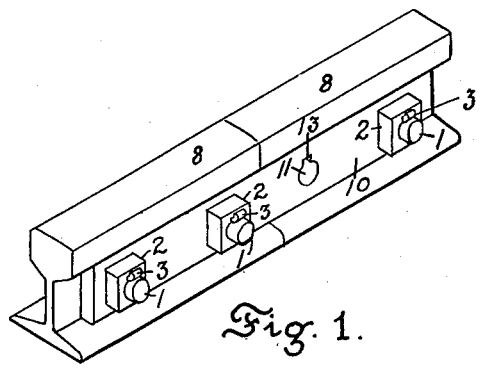
Figure 2:
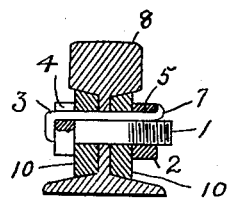
Figure 3:
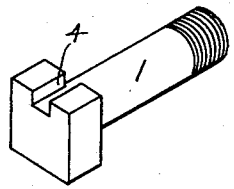
Figure 4:
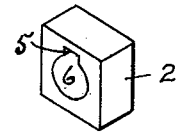
Figure 5:
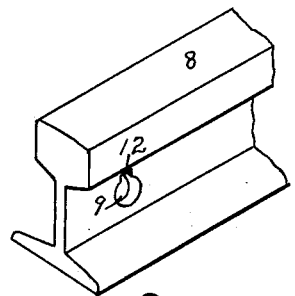

In the accompanying drawings, Figure 1 is a perspective view showing my invention applied to the fish-plates and railway-rails, one bolt being omitted to show the groove in the fish-plate above the bolt-hole. Fig. 2 is a vertical sectional view. Fig. 3 is a perspective view of the bolt. Fig. 4 is a perspective view of the nut. Fig. 5 is a perspective view of the rail, partly broken away, showing the groove above the bolt-hole.

Referring to the accompanying drawings, forming part of this specification, and in which similar numerals of reference designate like parts, 1 designates the bolt, 2 the nut, and 3 the locking-pin. The head of the bolt 1 is provided with a groove 4, extending from the outer edge thereof into and terminating on a line with the body of the bolt. The nut 2 is also provided with a groove 5, extending laterally from the central aperture 6 sufficiently far to permit of the locking-pin 3 being inserted therein. The pin 3 projects through the groove 5 in the nut 2 and also through the groove 4 in the head of the bolt. The head 7 of the said pin 3 impinges against the nut 2, and the outer end is bent at right angles at and rests down against the head of the bolt when the parts are locked in position. When the parts are in the position just described, the locking-pin 3 rests on the body of the bolt 1.

For the purpose of illustration I have shown my invention as applied to the railway-rails and fish-plates, in which event the rails 8 are provided with the usual holes 9 for the bolts 1, and the fish-plates 10 are provided with the usual holes 11 for the bolts 1, and in addition to the holes 9 and 11 the rails and fish-plates are also provided with grooves 12 and 13, extending laterally from the holes 9 and 11, respectively. The grooves 12 in the rails register with the grooves 13 of the fish-plates when the latter are in position, and after the bolts 1 are inserted through the fish-plates and rail the head of the said bolt is turned until the groove 4 therein registers with the grooves 12 and 13 in the rail and fish-plates, respectively. The nut 2 is then screwed upon the bolt 1 until in the proper position with the groove 5 in line with the grooves of the rail, fish-plates, and head of the bolt. The locking-key 3 is then inserted through the grooves in nut 2, fish-plates 10, rails 8, and the head of the bolt 1 and the end bent down over the head of the bolt. It will be seen from the foregoing description that neither the bolt nor the nut can turn when the parts are in the position just described. While I have shown the locking-pin 3 bent down over the head of the bolt, it is obvious the said end of the pin may be threaded and a nut applied thereto to hold the pin in position.

Having thus described my invention, what I claim is—

1. A nut and bolt lock consisting of a bolt having a groove in its head extending from the outer edge into and terminating on a line with the body of the bolt, a nut having a central aperture and a groove extending laterally from said aperture, and a locking-pin resting in the grooves in the bolt-head and nut and having a head on one end impinging against the nut and the other end secured to the head of the bolt.

2. A nut and bolt lock consisting of a bolt having a groove in the head thereof extending from the outer edge into and terminating on a line with the body of the bolt, a nut having a central aperture and a groove extending laterally from said aperture, and a locking-pin resting in the grooves in the bolt-head and nut.

3. A nut and bolt lock consisting of a bolt having a groove in the head thereof, extending from the outer edge into and terminating on a line with the body of the bolt, a nut having a central aperture and a groove extending laterally from the said aperture, a locking-pin resting in the grooves in the nut and bolt-head and having a head on one end and the other end bent down over the head of the bolt.

4. The combination with the railway-rails having apertures therein and a groove extending laterally from each aperture, the fish-plates having apertures therein and a groove extending laterally from each aperture, of the bolt extending through the apertures in the rails and fish-plates and having a groove in the head thereof, a nut threaded upon the said bolt and having a central aperture and a groove extending laterally from the said aperture, and a locking-pin projecting through the grooves in the nut, bolt-head, fish-plates and rails, whereby the said bolt and nut will be held in position and prevented from turning.

In testimony whereof I have signed my name to this specification in the presence of two subscribing witnesses.

SAMUEL C. KINDIG.

Witnesses:
CHAPIN A. FERGUSON,
HENRY WATSON.